(12) United States Patent
Yuan et al.

(10) Patent No.: US 9,279,505 B2
(45) Date of Patent: Mar. 8, 2016

(54) VALVE CORE ASSEMBLY AND VALVE ADOPTING THE VALVE CORE ASSEMBLY

(75) Inventors: Fang Yuan, Shanghai (CN); Zuocheng Qian, Shanghai (CN); Kai Gong, Shanghai (CN); Qingxin Liao, Shanghai (CN)

(73) Assignee: SHANGHAI HONGY AN RETURNABLE TRANSIT PACKAGINGS CO., LTD., Shanghai (CN)

( * ) Notice: Subject to any disclaimer, the term of this patent is extended or adjusted under 35 U.S.C. 154(b) by 97 days.

(21) Appl. No.: 14/342,874

(22) PCT Filed: Jul. 13, 2012

(86) PCT No.: PCT/CN2012/078634
§ 371 (c)(1),
(2), (4) Date: May 27, 2014

(87) PCT Pub. No.: WO2013/034032
PCT Pub. Date: Mar. 14, 2013

(65) Prior Publication Data
US 2014/0252254 A1    Sep. 11, 2014

(30) Foreign Application Priority Data

Sep. 5, 2011  (CN) .......................... 2011 1 0260851

(51) Int. Cl.
*F16K 5/06*  (2006.01)
*F16K 5/20*  (2006.01)

(52) U.S. Cl.
CPC .................. *F16K 5/0647* (2013.01); *F16K 5/20* (2013.01); *F16K 5/204* (2013.01)

(58) Field of Classification Search
CPC ......... F16K 5/0647; F16K 5/20; F16K 5/204; F16K 5/06
USPC .................. 251/188, 187, 162, 163, 160, 192
See application file for complete search history.

(56) References Cited

U.S. PATENT DOCUMENTS 3,033,513 A * 5/1962 Vulliez .................... F16K 5/162
                                                    251/163
3,552,434 A * 1/1971 Haenky ..................... F16K 5/08
                                                    137/556

(Continued)

FOREIGN PATENT DOCUMENTS

CN      1298070      6/2001
CN      2929383      8/2007

(Continued)

*Primary Examiner* — Mary McManmon
*Assistant Examiner* — David Colon Morales
(74) *Attorney, Agent, or Firm* — Hamre, Schumann, Mueller & Larson, P.C.

(57) ABSTRACT

A valve core assembly and a valve adopting the valve core assembly. The valve core assembly comprises a valve core (4) and a transmission member (7) having a common axis, and a sliding ejector pin (6) arranged along an axis perpendicular to the common axis. The valve core assembly is disposed inside a valve body (1) and is rotatable about the common axis upon engaging with the valve body (1). The valve core (4) has one concave portion, and the transmission member (7) is at least partially placed inside the concave portion. A radial inwardly-convex profile (9) is formed at the circumferential wall inside the concave portion, the transmission member (7) is formed with a radial outwardly-convex profile (72), and when a valve rod (2) drives the sliding ejector pin (6) and the transmission member (7) to rotate, the radial inwardly-convex profile (9) in the concave portion of the valve core (4) engages with the sliding ejector pin (6) and the radial outwardly-convex profile (72) of the transmission member (7) to switch the valve core among an open state, a pre-closed state and a fully-closed state. The valve core assembly has a simple structure and a high space utilization, so as to minimize the size of the valve, and the opening torque is small and the sealing performance is desirable.

11 Claims, 8 Drawing Sheets

(56) References Cited

U.S. PATENT DOCUMENTS

| | | | | |
|---|---|---|---|---|
| 3,941,351 A | * | 3/1976 | Graham | F16K 5/204 251/161 |
| 4,013,264 A | * | 3/1977 | Friedell | F16K 5/061 251/129.11 |
| 4,029,292 A | * | 6/1977 | Kramer | F16K 5/204 251/163 |
| 4,141,536 A | * | 2/1979 | Graham | F16K 5/204 251/161 |
| 4,509,718 A | * | 4/1985 | Bormioli | F16K 5/204 251/163 |
| 4,634,098 A | * | 1/1987 | Varden | F16K 1/24 137/559 |
| 4,917,354 A | * | 4/1990 | Chambers | F16K 5/204 251/160 |
| 4,940,210 A | * | 7/1990 | Gilmore | F16K 5/204 251/160 |
| 7,165,568 B2 | | 1/2007 | Kessell et al. | |
| 7,775,502 B2 | | 8/2010 | Ohta | |
| 2013/0341545 A1 | * | 12/2013 | Qian | F16K 5/0647 251/188 |

FOREIGN PATENT DOCUMENTS

| | | |
|---|---|---|
| CN | 201166141 | 12/2008 |
| CN | 201902691 | 7/2011 |
| CN | 102322536 | 1/2012 |
| CN | 202215771 | 5/2012 |
| JP | 5663175 | 5/1981 |
| JP | 2009-287358 | 12/2009 |
| WO | WO 2007/030052 | 3/2007 |

* cited by examiner

VALVE CORE ASSEMBLY AND VALVE ADOPTING THE VALVE CORE ASSEMBLY

TECHNICAL FIELD

The invention relates to a valve core assembly and a valve adopting the valve core assembly, specifically relates to an internal or external low torque valve for composite intermediate bulk containers (IBC).

BACKGROUND OF THE INVENTION

The composite intermediate bulk containers (IBC) are provided with valves, such as the butterfly valve disclosed in WO2007/030052 A1, however, its sealing performance is not desirable and leakage may be occurred easily.

One of such external valves is DN50 ball valve; however, the valve has disadvantages that the torque is large, difficult to operate, too many components, and high cost.

Chinese patent No. 200720082066 disclosed a low torque ball valve, which provides a low torque valve comprising a valve body, a valve ball, a valve seat, a bearing seat, a valve stem, a driving means, and a valve ball bearing connection. The patent has several disadvantages. The structure of the driving device is complex, and extremely occupies the external space of the valve body. The driving device involves many parts, resulting in the complexity of the assembling process. The rotation angle for opening or closing the valve is 180 degrees. The working space formed by the valve rod and the driving device requires a very high quality of sealing process, thus the traditional sealing methods and processes are likely to cause leakage. In addition, since the cost of manufacturing the driving device is very high, it does not conform to the purpose for economy and environment friendly.

There has recently developed a guide slot lifting rod ball valve at domestic and abroad. There provided on the valve rod a S-shaped guide slot, which engages with the guide pin, so that when the valve rod rises, it causes the ball to disengage from the valve seat. Then, the valve rod further rotates 90° counterclockwise and fully opens the valve. When the valve rod is moving down, the ball rotates 90° clockwise, then being pressed towards the valve seat to close the valve. The shortcomings of the technology is that a long S-shaped guide slot being provided on the valve rod, thus, when the valve rotates for opening or closing, the valve rod needs to move up and down spirally along the guide slot, resulting in a huge space for the guide slot and a large rotation angle and other shortcomings.

Chinese Patent Application No. 99124192.4 disclosed a structure for opening and closing a valve, which is a disk-shaped two-track rotary with deploy-close structure. The structure comprises a fixed disk, a rotating disk and a stop pin. When the external force drives the valve rod together with the rotating disk to move the stop pin, the stop pin rotates clockwise along the "arc" track of the fixed disk. When rotated to the "straight" track connected to the "arc" rail track, the rotating disk rotates clockwise further, and the stop pin deploys the surrounding of the fixed disk along the "straight" track of the fixed disk under the forced action by the "deploy-close" track of the rotating disk. At this time, the stop pin structure together with the valve sealing structure close to the valve seat, thus close the valve. When the valve rotates counter-clockwise together with the rotating disk, the stop pin together with the sealing structure move towards the centre of the fixed disk along the "straight" track of the fixed disk under the forced action by the "deploy-close" track of the rotating disk, and then rotate counter-clockwise along the "arc" track of the fixed disk to open the valve. The technical shortcoming of the patent is to use the "arc connected with straight line" track, which requires high precision and complex processing. Further, since the valve core is a combined sphere, it is difficult to get a balanced preload force, resulting in damage to the valve core and shortening the life of the valve.

Chinese Patent No. 200620105067 disclosed an orbit plug valve, comprising a valve body, a valve cover, an operating member, a valve rod, a valve seat, a valve plug which together with the valve seat forming a conical surface sealing, and an orbital mechanism. The orbital mechanism comprises a track with two guide slots mounting on the neck portion of the valve plug and a plate with two guide pins inserting into said guide slots, as well as a lock nut and an adjusting ring for adjusting the mounting position of the track. The shortcomings of the present patent are that the transmission device structure is complex, and extremely occupy the external space of the valve body. Further, the transmission device involves more parts, resulting in complicated assembly process. In addition, since the valve has a plug forming a cone surface sealing as well as a lock nut and an adjusting ring for adjusting the mounting position of the track, it must be adjusted several times, resulting in complex operation.

SUMMARY OF THE INVENTION

The object of the invention is to provide a valve core assembly and a valve adopting the valve core assembly, which have advantages that the torque is small when open the valve, the structure is simple, easy to operate, and the sealing performance is desirable.

According to the first aspect, the disclosure provide a valve core assembly disposed in a valve body and being rotatable about a common axis upon engaging with the valve body, the valve core assembly comprising a valve core, a valve rod and a transmission member having the common axis, wherein: further comprises a sliding ejector pin arranged along an axis perpendicular to the common axis; the valve core has one concave portion; the transmission member is combined with the valve rod at the end of the valve rod and is able to rotate along with the valve rod; the transmission member is at least partially placed inside the concave portion; a radial inwardly-convex profile is formed at the circumferential wall inside the concave portion; the transmission member is formed with a radial outwardly-convex profile; a valve rod cavity is provided radially on the end of the valve rod for accommodating the sliding ejector pin; an inwardly-convex profile is provided on the valve body for surrounding the valve rod; when rotating the valve rod, the inwardly-convex profile of the valve body abuts against the sliding ejector pin and drives the sliding ejector pin to move radially in the valve rod cavity; when the sliding ejector pin in the valve rod move radially until the inwardly-convex profile of the valve body driving the sliding ejector pin to disengage with the valve core, the radial outwardly-convex profile of the transmission member at the end of the valve rod engages with the radial inwardly-convex profile of the concave portion of the valve core, such that the rotation of the transmission member around the common axis is converted into a radial movement which causes the valve core to press against the valve seat of the valve body.

In a preferred embodiment, the sliding ejector pin comprises a pin body, a sliding pin and a projection, the sliding pin and the projection being perpendicular to the pin body and extending from both ends of the pin body respectively in opposing direction, the sliding ejector pin being placed in the valve rod cavity, and there is a detachable relationship between the projection of the sliding ejector pin and the radial inwardly-convex profile formed at the circumferential wall inside the concave portion of the valve core.

In a preferred embodiment, the radial inwardly-convex profile formed at the circumferential wall inside the concave portion of the valve core is provided with at least two pits and a projection separating the two pits; one of the two pits and the projection detachably engage with the radial outwardly-convex profile of the transmission member, the other of the two pits detachably engages with the projection of the sliding ejector pin.

In a preferred embodiment, the valve rod is formed with a transmission rod and a support portion being extended coaxially from the lower end of the transmission rod, the transmission member being further provided with a transmission hole for engaging with the transmission rod, the concave portion being further provided with an elongate positioning hole for engaging with the support portion.

In a preferred embodiment, the support portion is a cylindrical member, the elongate positioning hole being an elongate hole having two parallel sides and two arc-shaped ends.

In a preferred embodiment, the transmission rod is a splined rod, the transmission hole being a splined hole for engaging with the splined rod.

In a preferred embodiment, the sliding pin of the sliding ejector pin is a cylinder, the projection of the sliding ejector pin being an elongate body, and the side of the elongate body engaging with the pit is an arc surface.

In a preferred embodiment, the radial outwardly-convex profile of the transmission member is generally in form of rectangular whose two axial corners are rounded or chambered.

According to another aspect, the disclosure provides a valve comprising a valve body, a positioning rod, a valve seat, a valve core assembly, the valve body comprising: an inlet and an outlet having a common horizontal axis, an inner space being formed between the inlet and the outlet for accommodating the valve core assembly, the valve seat being placed on the inner side of the inlet; a valve rod hole and a bottom hole formed on the top end wall and the bottom end wall of the valve body along a vertical axis perpendicular to the horizontal axis; a part of the valve core assembly passes through the valve rod hole, the positioning rod hermetically accommodated in the bottom hole, the valve core assembly being able to rotate around the vertical axis, such that the valve core detachably hermetically engage with the valve seat, wherein: the valve core assembly is the valve core assembly described above; when the valve rod drives the sliding ejector pin and the transmission member to rotate, the radial inwardly-convex profile in the concave portion of the valve core engages with the sliding ejector pin and the radial outwardly-convex profile of the transmission member to switch the valve core among an open state, a pre-closed state and a fully-closed state. In a preferred embodiment, a handle is provided on the top of the valve rod of the valve core assembly.

In a preferred embodiment, the valve is a ball valve.

A valve comprising the valve core assembly described above may achieve the following actions and effects:

The valve rod hole of the valve body is provided with a radial inwardly-convex profile, the two ends of the sliding ejector pin being engaged with the inwardly-convex profile, and when rotating the valve rod, the sliding ejector will move in radially direction of the valve rod under the action of the inwardly-convex profile. A concave portion is provided on the top of the valve core, a pit being formed at the circumferential wall inside the concave portion, a part of the sliding ejector pin may be inserted into the pit so as to drive the valve core to rotate radially around a positioning rod. A positioning hole is provided radially in the center of the concave portion of the valve core, when the valve is rotated to a closed state, the support portion of the valve rod is placed in the positioning hole, which causes the valve core to move radially inside the valve body only.

When the projection of the sliding ejector pin is positioned partly in the pit of the concave portion, a gap exit between the valve core and valve seat and the valve is opened, thus the valve core may be driven by the valve rod through the sliding ejector pin to rotate around the positioning rod; when the valve core is rotated to a pre-closed position, since the position limiting and stopping projections provided on the bottom of the valve core and the position limiting and stopping blocks provided on the bottom of the valve body, the valve core 4 may only be rotated within 90 degrees inside the valve body, thus the valve core will be not rotated along with the valve rod any more. As the valve rod continue to rotate, the sliding ejector pin which is positioned partly in the pit of the concave portion will be moved under the action of the inwardly-convex profile provided on of the valve rod hole of the valve body, such that the portion of the sliding ejector pin which is positioned in the pit of the concave portion leaves the pit, causing the valve rod to move relative to the valve core. The radial outwardly-convex profile of the transmission member and the projection of the concave portion of the valve core squeeze with each other as the transmission member is driven by the valve rod. When the support portion of the valve rod and the elongate positioning hole of the bottom wall of the concave portion are engaged with each other, the valve core is moved axially along the positioning rod so as to squeeze the valve seat to achieve a fully sealed state and fully closed.

In a word, the valve core can rotate axially around the positioning rod and move radially, the axial rotation leading to open or close the valve, the radial movement leading to achieve sealing.

Since a gap exits between the valve core and the valve seat during switch the valve from a fully opened state to a pre-closed state as well as switch the valve from a pre-closed state back to the fully opened state as shown in FIG. 11, the torque is very low when rotating the valve rod, thus achieve a low torque when opening and closing a valve.

The invention has the following advantages: the valve core assembly and valve adopting the valve core assembly not only has a low opening and closing torque and excellent sealing performance, but also has a simple structure, a high space utilization, fewer parts and easy to manufacture.

DETAILED DESCRIPTION

Figure 1:
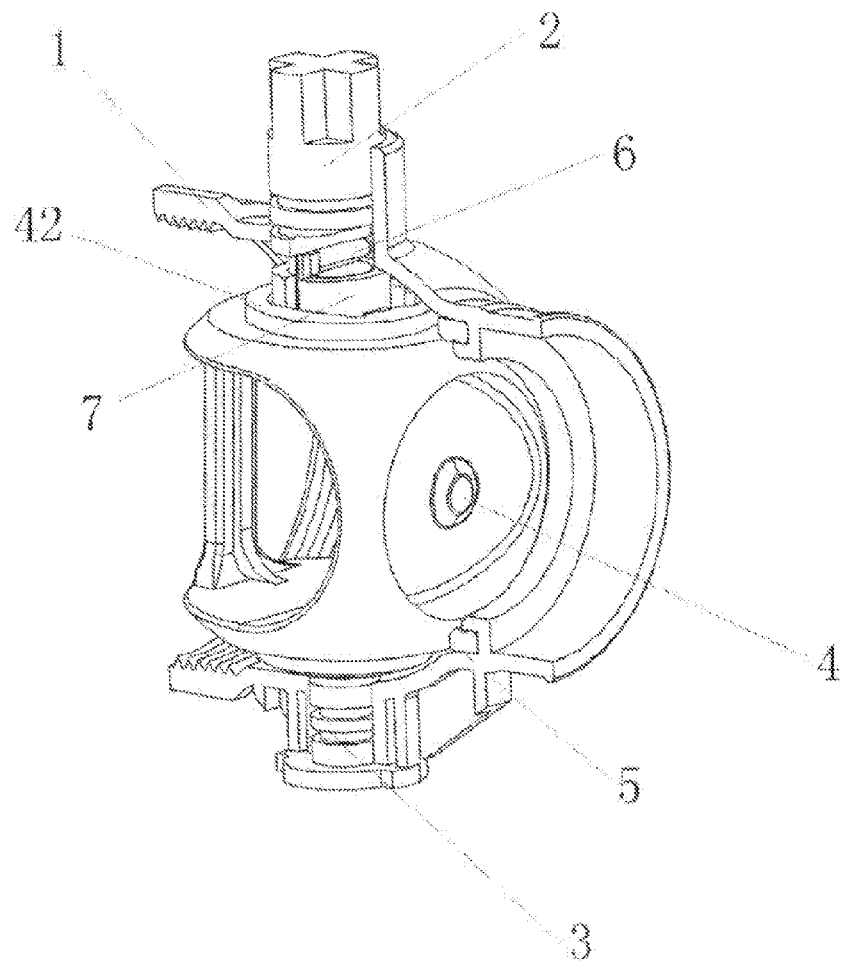
FIG. 1 is a perspective view of the valve with partly cut away according to an embodiment of the invention.

The implement of the invention is not limited to the following embodiments, and those skilled in the art will understand the invention from the spirit of the following embodiments. All the terms should be explained as broadly as possible based on the essence of the invention. For example, the valve rod is a part used to control the movement of the valve core; the transmission device is a device used to transfer the operation intent of the operator for operating the valve core, where the operation intent is to realize the opening and the closing of the valve through rotating the valve rod.

The preferred embodiments of the invention will be described in detail with the reference to the drawing in the following. It should be noted that the same or like numbers indicate the same or like members. And some of the members are omitted for clarity.

Figure 2:
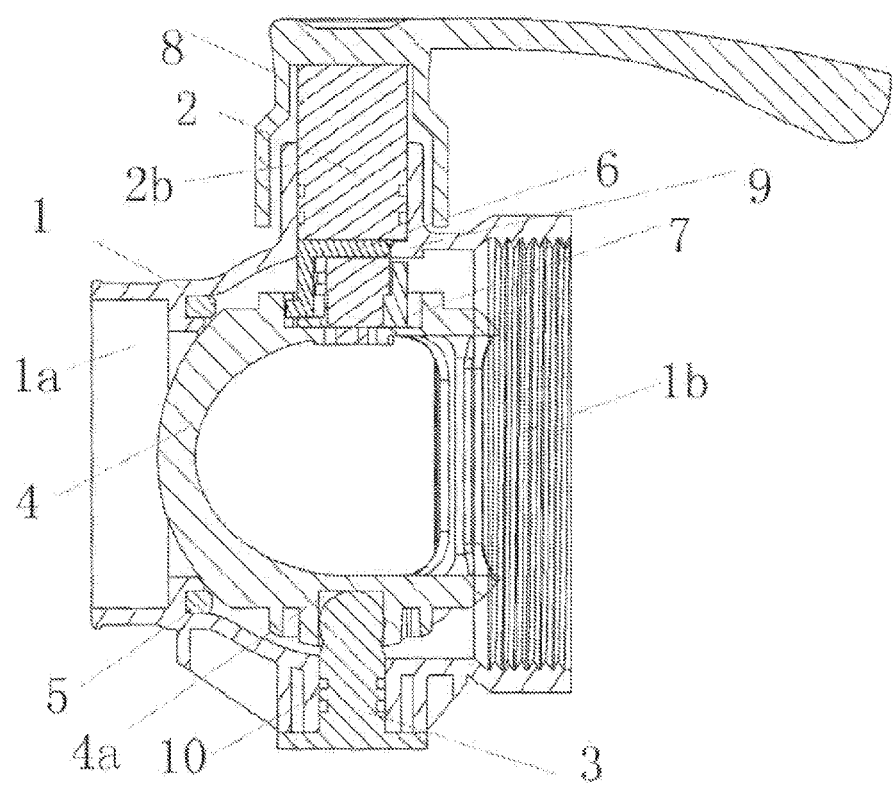
FIG. 2 is the side cross-sectional view of the valve of FIG. 1.
Figure 4:
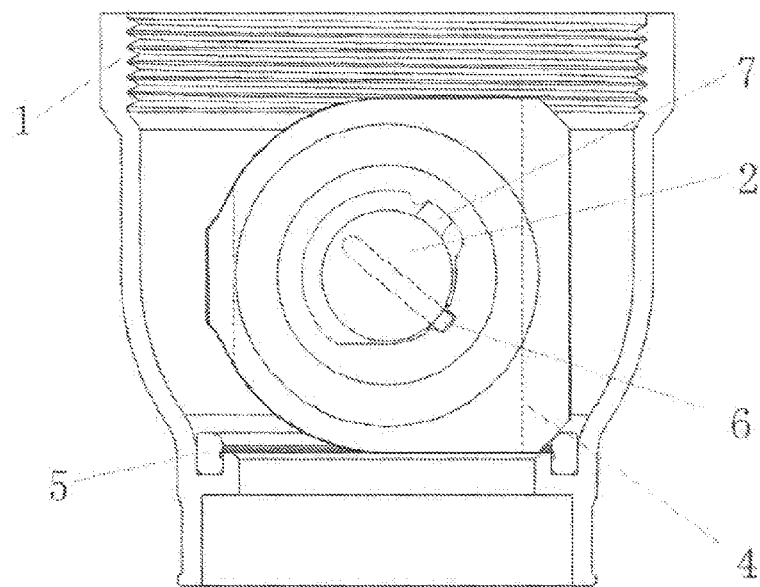
FIG. 4 is the top cross-sectional view the concave portion of the valve core of the valve core assembly when the valve is open, wherein the concave portion has been rotated 90 degrees counterclockwise.

As shown in FIG. 1, FIG. 2 and FIG. 4, a valve according to one embodiment comprises a valve body 1, a valve rod 2, a positioning rod 3, a valve core 4, a valve seat 5, a sliding ejector pin 6 and a transmission member 7. Wherein, the valve body 1, the valve rod 2, the positioning rod 3 and the transmission member 7 have a common axis, and the valve core 4, the valve rod 2, the sliding ejector pin 6 and a transmission member 7 make up the valve core assembly.

Figure 5:
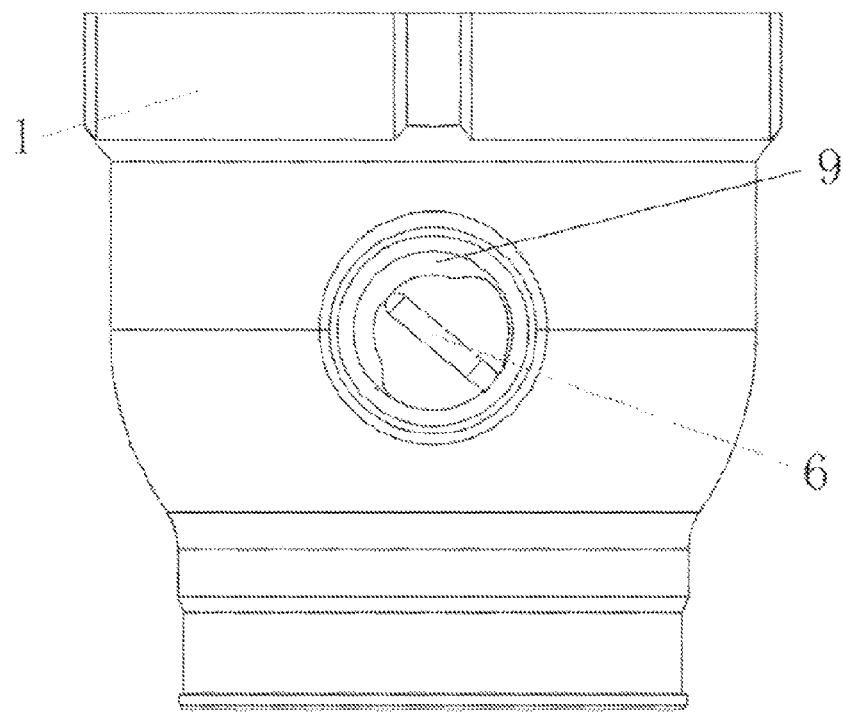
FIG. 5 is a top view, indicating the relationship between the sliding ejector pin and the valve body.
Figure 14:
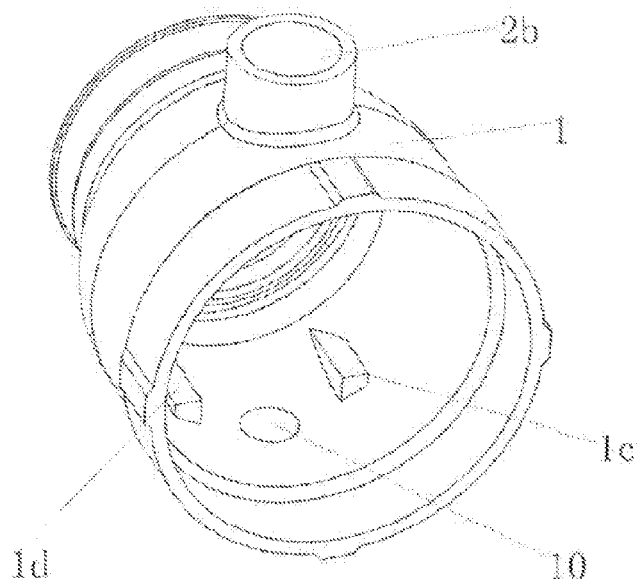
FIG. 14 is a perspective view of the valve body, showing a position limiting and stopping structure provided on the bottom of the valve body.

As shown, valve body 1 is a housing having a top end and bottom end as well as left and right sides. There is an inner space formed in the housing for accommodating the valve core 4, transmission member 7 and part of the valve rod and the sliding ejector pin. An inlet 1a and an outlet 1b are formed on the left side and right side along a horizontal axis (not shown), respectively. The inlet 1a and the outlet 1b are communicated to a container and external, respectively. The valve seat 5 is provided along the horizontal axis at the inner side of the inlet 1a. The top end wall and the bottom end wall of the valve body 1 are formed with a valve rod hole 2b and a bottom hole 10 along a vertical axis (not shown) perpendicular to the horizontal axis, respectively. As shown in FIG. 14, position limiting and stopping blocks 1d, 1c are provided on the bottom of the valve body 1 at two sides of the bottom hole 10 along its radial direction. The position limiting and stopping blocks 1d, 1c are engaged with the limiting and stopping projection of valve core respectively (which will be described in more detail in the following), such that the valve core 4 may only rotate within 90 degrees in the valve body 1. In the present invention, a radial inwardly-convex profile 9 is formed on the inner wall of the valve rod hole 2b at the bottom of the valve rod hole 2b, as shown in FIGS. 2 and 5.

Figure 3:
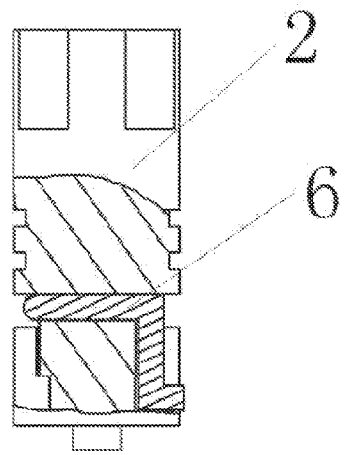
FIG. 3 is a schematic view of the valve rod and the sliding ejector pin assembly.
Figure 8:
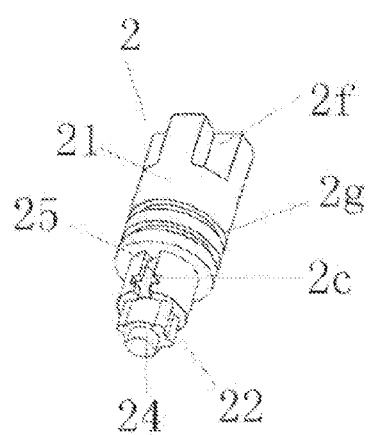
FIG. 8 is the perspective structure view of the valve rod according to the embodiment of FIG. 1.
Figure 9:
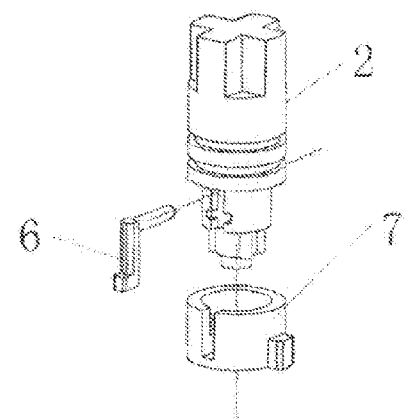
FIG. 9 is the exploded perspective view of the valve rod, the sliding ejector pin and the transmission member according to the embodiment of FIG. 1

As shown in FIG. 2, the valve rod 2 is rotatably accommodated in the valve rod hole 2b. The positioning rod 3 is accommodated in the bottom hole 10 of the valve body. The lower portion of the positioning rod 3 is secured to the wall of the bottom hole 10 through a seal ring, the upper portion of the positioning rod 3 extends out of the bottom hole 10, thus engages with the supporting hole of the valve core (which will be further described hereafter). The structure of the valve rod 2 is shown in FIG. 3, FIG. 8 and FIG. 9, wherein a cross head 2f is formed on the upper portion of the valve rod 2, on which a handle 8. At least one angular slot 2g is provided on the circumference of the valve rod 2 at its middle portion (two slots in the drawing). A sealing ring is placed in the angular slot 2g so as to achieve the sealing between the wall of the valve rod hole 2b and the valve rod 2. A radial hole 25 is provided on the valve rod 2 below the angular slot 2g (that is, the end of the valve rod), as shown in FIG. 8. It should be noted that the radial hole 25 may be provided on the end of the valve rod at any position along its axis. A cross slot 2c extending downwardly from one end of the hole 25 is provided on the external wall, the cross slot 2c being constructed of a horizontal slot and an axial slot perpendicular to the horizontal slot, the axial slot extending to the lower end face of the middle portion of the valve rod. The lower portion of the valve rod 2 is formed with a transmission rod 22. In the present embodiment, the transmission rod 22 is a splined rod 22, and a support portion 24 being extended coaxially from the lower end face of the splined rod 22. The support portion 24 is a cylindrical member, in this embodiment, the support portion 24 is a cylindrical whose cross-section is circular. However, those skilled in the art should be understood that the cross section of the support portion 24 may be triangular, square, etc.

Figure 6:
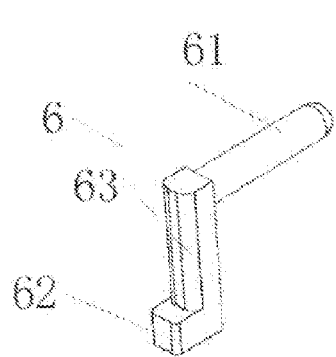
FIG. 6 is the perspective structure view of the sliding ejector pin according to the embodiment of FIG. 1.

FIGS. 6 and 9 show a specific structure of the sliding ejector pin 6, as shown, the sliding ejector pin 6 comprises a pin body 63, and a sliding pin 61 and a projection 62, the sliding pin 61 and the projection 62 being perpendicular to the pin body and extending from both ends of the pin body respectively in opposing directions. The sliding pin 61 is positioned in the radial hole 25, and the distal end of the sliding pin 61 abuts against the inwardly-convex profile of the valve body, as shown in FIGS. 2 and 5. The sliding pin 61 is a cylinder whose cross-section is circular in this embodiment. However, the cross-section of the sliding pin 61 may be circular, oval, hexagonal and any suitable shape depending on needs. The projection 62 is an elongate body in the present embodiment, the cross section of which is a rectangular; the side engaging with the concave portion of the valve core 4 is an arc surface (which will be described below). It should be understood for the skilled person that the projections 62 may be an elongate body whose cross section is a circular, a polygonal and the like. When assembling the sliding ejector pin 6 and the valve rod 2, the cylindrical sliding pin 61 is inserted through the radial hole 25 of the valve rod 2, the pin body 63 being fitted in the axial slot of the cross slot 2c. When the assembly has been finished, as shown in FIG. 3, the sliding pin 61 of the sliding ejector pin 6 can slide radial inwardly or outwardly in the hole 25.

Figure 7:
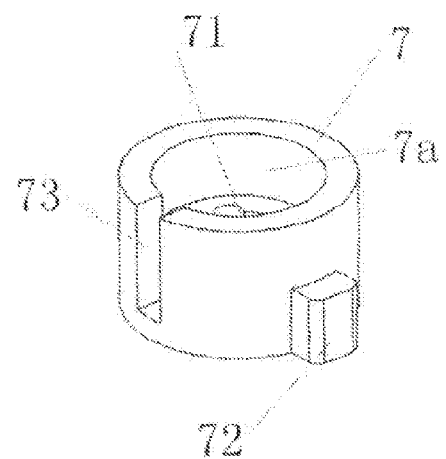
FIG. 7 is the perspective structure view of the transmission member according to the embodiment of FIG. 1.

FIG. 7 shows a specific construction of the transmission member 7. As shown, the transmission member 7 is a cylindrical having a bottom and an opening opposing the bottom. An inner hole 7a is provided axially inside the transmission member 7 between the opening and the bottom for accommodating the valve rod 2. A transmission hole is provided on the bottom which is a splined hole in the embodiment; a radial outwardly-convex profile 72 protruding outwardly is formed on the outer periphery of said bottom. As shown, the radial outwardly-convex profile is generally rectangular whose two axial corners are rounded or chambered. It should be noted that the radial outwardly-convex profile may be other non-regular shape. The radial outwardly-convex profile 72 may engage with the radial inwardly-convex profile provided on the inner wall of the concave portion of the valve core 4 (which will be described below). The transmission hole 71 is engaged with the transmission rod 22 of the valve rod 2, that is, the splined hole 71 being engaged with the splined rod 22 in the embodiment, which will cause the valve rod 2 to drive the transmission member 7 to rotate. An elongate cut 73 extending downwardly from the opening of the inner hole 7*a* is provided on the out wall of the cylindrical body 7 of the transmission member 7, when the valve rod 2 and the sliding ejector pin 6 assembly is inserted into the inner hole 7*a*, the pin body 63 and the projection 62 of the sliding ejector pin are just accommodated in the cut 73.

Figure 10:
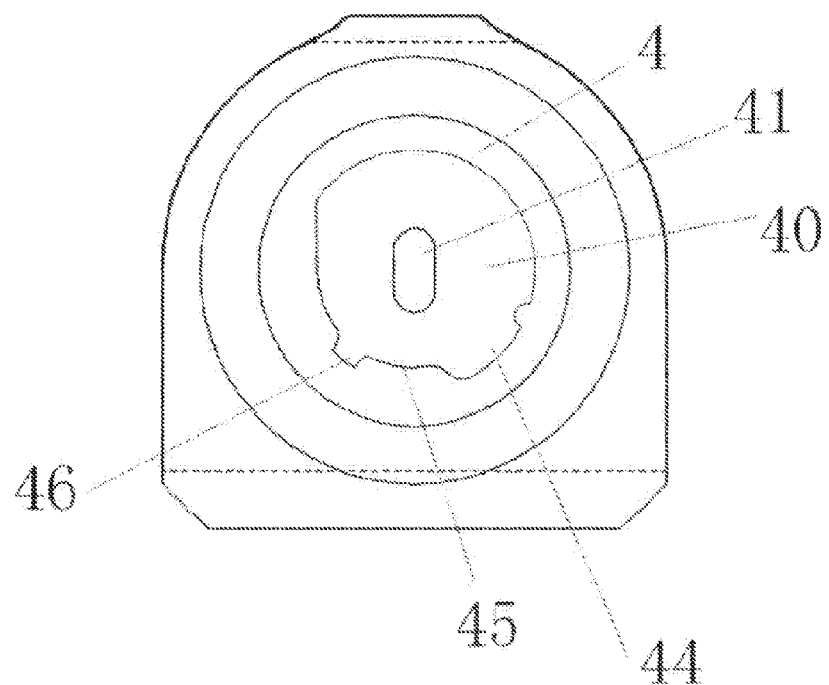
FIG. 10 is the perspective structure view of the valve core according to the embodiment of FIG. 1, which has been rotated 90 degrees as compared to FIG. 4.
Figure 15:
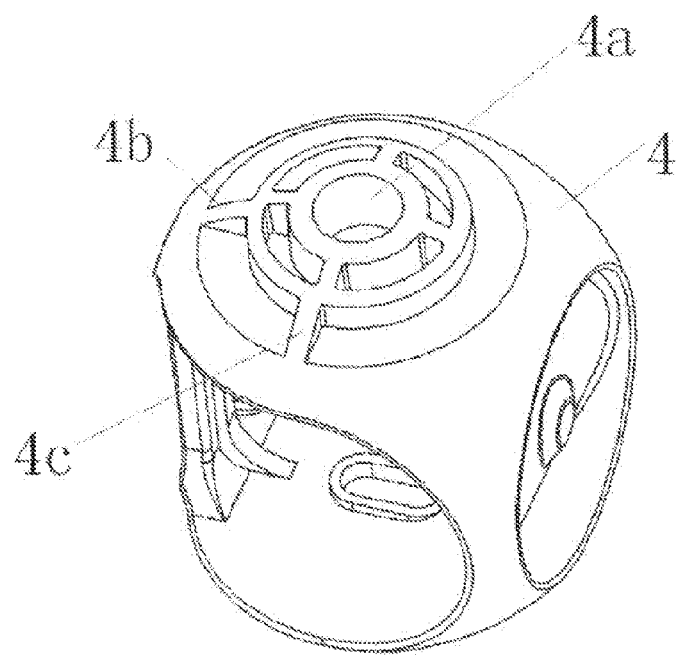
FIG. 15 is a perspective view of the valve core, showing a limiting and stopping projection structure provided on the bottom of the valve core.

FIG. 10 shows a structure of the valve core 4. The valve core 4 in the embodiment is in the form of a hollow spherical shell and has a vertical axis (not shown). A concave portion 40 extending along the vertical axis and a supporting hole 4*a* are provided on the top and the bottom of the spherical shell respectively. A strengthening boss 42 is provided around the concave portion 40 on the top of the valve core so as to have the concave portion 40 with a desired depth, as shown in FIG. 1, however, the strengthening boss 40 may be omitted. A radial inwardly-convex profile is formed in the inner wall of the concave portion 40, the radial inwardly-convex profile being provided with at least two pits 44, 46 and a projection 45 separating the two pits. One 44 of the two pits and the projection 45 may detachably engage with the radial outwardly-convex profile 72 (projections protruding outwardly) of the transmission member 7; and the other 46 of the two pits may detachably engages with the projection 62 of the sliding ejector pin. An elongate positioning hole 41 toward to the projection 45 is formed on the bottom of the concave portion so as to engage with the support portion 24, the elongate positioning hole 41 being an elongate hole having two parallel sides and two arc-shaped ends. As shown in FIG. 15, position limiting and stopping projections 4*b*, 4*c* are provided radially on the bottom of the valve core 4 outside the support hole 4*a* so as to engage with the position limiting and stopping blocks 1*d*, 1*c* of the valve body respectively, the angle between the position limiting and stopping projections 4*b* and 4*c* is 90 degrees. During closing the valve, as the valve core rotates to the pre-closed position, the position limiting and stopping projection 4*c* engage with the position limiting and stopping blocks 1*d* so as to prevent the valve core from rotating over 90 degrees. During opening the valve, as the valve core rotates to the pre-opened position, the position limiting and stopping projection 4*b* engage with the position limiting and stopping blocks 1*c* so as to prevent the valve core from rotating over 90 degrees.

Figure 12:
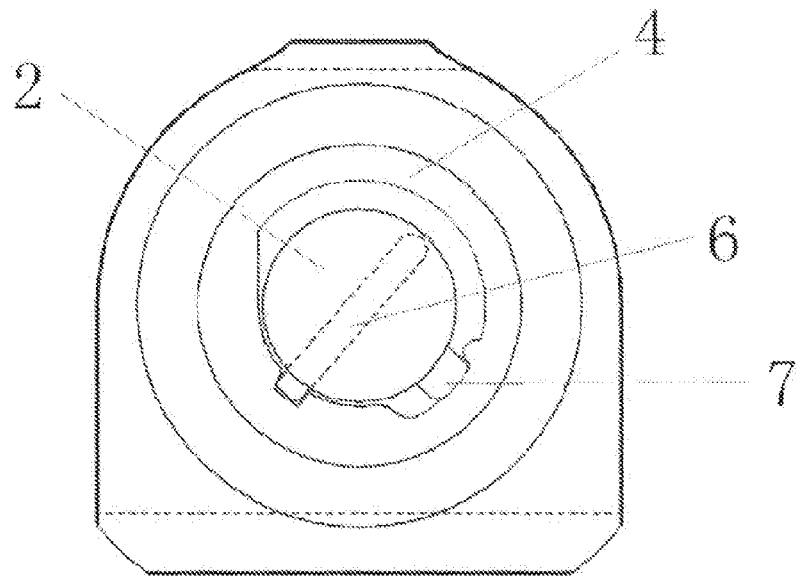
FIG. 12 is the top view of the valve according to the embodiment of FIG. 1, wherein the valve is pre-closed.

When the valve is rotated to a pre-closed state as shown in FIG. 12, the support portion 24 of the valve rod is placed in the positioning hole 41, which cause the valve core 4 to move radially only inside the valve body 1.

Figure 11:
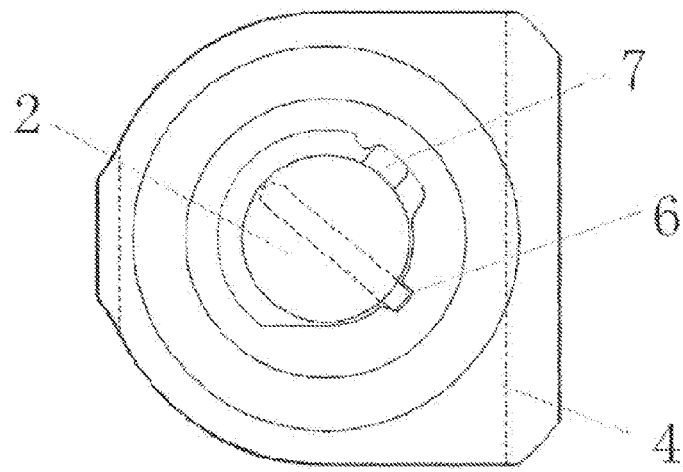
FIG. 11 is the top view of the valve according to the embodiment of FIG. 1, wherein the valve is fully opened.

FIGS. 4 and 11 show the relative positions of the valve core 4, the valve rod 2, the sliding ejector pin 6, and the transmission member 7 when the valve is opened. When rotate the valve rod 2 using a handle, the valve core 4 will rotate along with the valve rod 2, since the projection 62 of the sliding ejector pin 6 is positioned in the pit 46 provided on the inner wall of the concave portion 40 of the valve core 4. When the valve core is rotated to a pre-closed position, as shown in FIG. 12, the valve core 4 will be not rotated along with the valve rod 2 any more, since the position limiting and stopping projections 4*b*, 4*c* provided on the bottom of the valve core 4 and the position limiting and stopping blocks 1*d*, 1*c* provided on the bottom of the valve body 1 cause the valve core 4 to rotate within 90 degrees only inside the valve body. As the valve 2 continue to rotate, the projection 62 of the sliding ejector pin 6 will be moved under the action of the inwardly-convex profile 9 provided on the side wall of the valve rod hole 2*b* of the valve body 1, and the valve core 4 will not be rotated along with the valve rod 2 as the projection 62 disengaged with the pit 46 provided on the concave portion 40 of the valve core 4. The radial outwardly-convex profile of the transmission member 7 and the projection 45 of the valve core 4 squeezes with each other as the transmission member 7 is driven by the valve rod 2. When the support portion 24 of the valve rod 2 and the elongate positioning hole 41 of the bottom wall of the concave portion 40 are engaged with each other, the valve core 4 is moved axially along the horizontal axis of the valve body 1 so as to squeeze the valve seat 5, thus achieve a fully closed state, as shown in FIG. 13.

When open the valve, the valve rod 2 is rotated reversely, the sliding ejector pin 6 being rotated along with the valve rod 2, and the projection 62 of the sliding ejector pin 6 entering the pit 46 again under the action of the convex profile 9 of the valve body, the radial outwardly-convex profile 72 of the transmission member 7 being disengaged with the projection 45 of the valve core 4, thus the rotation of the valve rod 2 will cause the valve core to rotate, resulting opening the valve.

Figure 13:
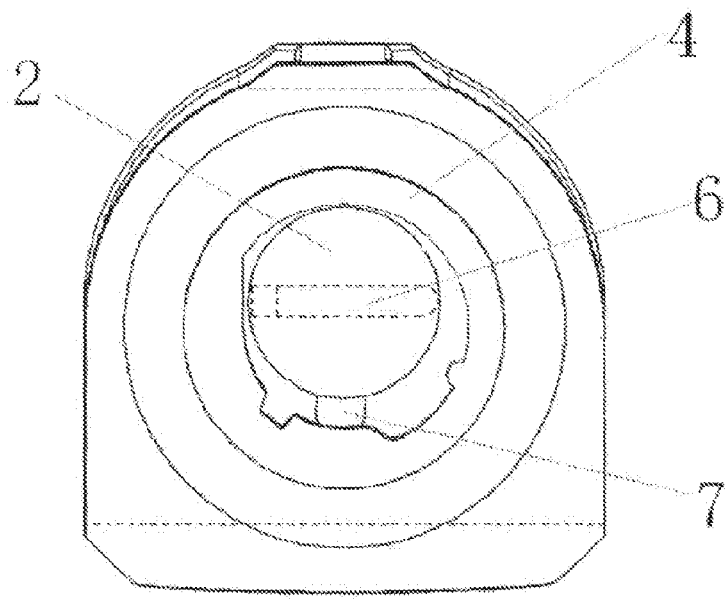
FIG. 13 is the top view of the valve according to the embodiment of FIG. 1, wherein the valve is fully closed.

Since a gap exits between the valve core 4 and the valve seat 5 during switch the valve from a fully opened state as shown in FIG. 11 to a pre-closed state as shown in FIG. 12 as well as switch the valve from a fully closed state as shown in FIG. 13 back to the fully opened state, the torque is very low when rotating the valve rod, thus achieve a low torque when opening and closing a valve.

It should be noted that the embodiments described above is a ball valve, however, the structure of the present invention may also be applied to the other valve, e.g. butterfly valve. The members of the invention may adopt other configuration without departing from the spirit of the invention. For example, the handle 8 and the valve rod 2 may be separated part or integrated part. The configuration of the sliding ejector pin may be other sliding ejector pin which may engage with the valve rod 2 and concave portion 40 so as to achieve separation and reunion function. The coupling between the valve rod and the transmission member may adopt splined coupling, or screw coupling, anchoring, welding and other forms which are known to the person skilled in the art.

Those skilled in the art should be understood that the present invention may be implemented in other specific forms without departing from its spirit or essential characteristics. The above embodiments are to be understood in all respects only as illustrative and not restrictive. Accordingly, the scope of the invention is defined by the appended claims rather than the foregoing specification. All changes within the meaning and scope of the equivalents of the appended claims are to be within the scope of the appended claims.

The invention claimed is:

1. A valve core assembly disposed in a valve body and being rotatable about a common axis upon engaging with the valve body, comprises a valve core, a valve rod and a transmission member having the common axis, wherein: further comprises a sliding ejector pin arranged along an axis perpendicular to the common axis;

the valve core has one concave portion; the transmission member is combined with the valve rod at the end of the valve rod and is able to rotate along with the valve rod; the transmission member is at least partially placed inside the concave portion; a radial inwardly-convex profile is formed at a circumferential wall inside the concave portion;

the transmission member is formed with a radial outwardly-convex profile; a valve rod cavity is provided radially on the end of the valve rod for accommodating the sliding ejector pin; an inwardly-convex profile is provided on the valve body for surrounding the valve rod;

when rotating the valve rod, the inwardly-convex profile of the valve body abuts against the sliding ejector pin and drives the sliding ejector pin to move radially in the valve rod cavity; when the sliding ejector pin in the valve rod moves radially until the inwardly-convex profile of the valve body driving the sliding ejector pin to disengage with the valve core, the radial outwardly-convex profile of the transmission member at the end of the valve rod engages with the radial inwardly-convex profile of the concave portion of the valve core, such that the rotation of the transmission member around the common axis is converted into a radial movement which causes the valve core to press against the valve seat of the valve body.

2. The valve core assembly as claimed in claim 1, wherein the sliding ejector pin comprises a pin body, a sliding pin and a projection, the sliding pin and the projection being perpendicular to the pin body and extending from both ends of the pin body respectively in opposing directions, the sliding ejector pin being placed in the valve rod cavity, and there is a detachable relationship between the projection of the sliding ejector pin and the radial inwardly-convex profile formed at the circumferential wall inside the concave portion of the valve core.

3. The valve core assembly as claimed in claim 2, wherein the radial inwardly-convex profile formed at the circumferential wall inside the concave portion of the valve core is provided with at least two pits and a projection separating the two pits; one of the two pits and the projection detachably engages with the radial outwardly-convex profile of the transmission member, the other of the two pits detachably engages with the projection of the sliding ejector pin.

4. The valve core assembly as claimed in claim 1, wherein the valve rod is formed with a transmission rod and a support portion being extended coaxially from a lower end of the transmission rod, the transmission member being further provided with a transmission hole for engaging with the transmission rod, the concave portion being further provided with an elongate positioning hole for engaging with the support portion.

5. The valve core assembly as claimed in claim 4, wherein the support portion is a cylindrical member, the elongate positioning hole being an elongate hole having two parallel sides and two arc-shaped ends.

6. The valve core assembly as claimed in claim 4, wherein the transmission rod is a splined rod, the transmission hole being a splined hole for engaging with the splined rod.

7. The valve core assembly as claimed in claim 3, wherein the sliding pin of the sliding ejector pin is a cylinder, the projection of the sliding ejector pin being an elongate body, and the side of the elongate body engaging with the pit is an arc surface.

8. The valve core assembly as claimed in claim 1, wherein the radial outwardly-convex profile of the transmission member is generally rectangular whose two axial corners are rounded or chambered.

9. A valve, comprises a valve body, a positioning rod, a valve seat, a valve core assembly, the valve body comprising: an inlet and an outlet having a common horizontal axis, an inner space being formed between the inlet and the outlet for accommodating the valve core assembly, the valve seat being placed on the inner side of the inlet; a valve rod hole and a bottom hole formed on a top end wall and a bottom end wall of the valve body along a vertical axis perpendicular to the horizontal axis; a part of the valve core assembly passes through the valve rod hole, the positioning rod hermetically accommodated in the bottom hole, the valve core assembly being able to rotate around the vertical axis, such that the valve core detachably hermetically engage with the valve seat, wherein:

the valve core assembly is the valve core assembly according to claim 1;

when the valve rod drives the sliding ejector pin and the transmission member to rotate, the radial inwardly-convex profile in the concave portion of the valve core engages with the sliding ejector pin and the radial outwardly-convex profile of the transmission member to switch the valve core among an open state, a pre-closed state and a fully-closed state.

10. The valve core assembly as claimed in claim 9, wherein a handle is provided on the top of the valve rod of the valve core assembly.

11. The valve core assembly as claimed in claim 9, wherein the valve is a ball valve.

* * * * *